United States Patent [19]

Peterson et al.

[11] Patent Number: 5,486,684
[45] Date of Patent: Jan. 23, 1996

[54] MULTIPASS INDUCTION HEATING FOR THERMOPLASTIC WELDING

[75] Inventors: Todd R. Peterson, Federal Way; Michael A. Walker, Sumner, both of Wash.

[73] Assignee: The Boeing Company, Seattle, Wash.

[21] Appl. No.: 367,546

[22] Filed: Jan. 3, 1995

[51] Int. Cl.$^6$ ........................................................ H05B 6/10
[52] U.S. Cl. .......................... 219/633; 219/634; 219/656; 219/659; 156/274.2; 156/380.2
[58] Field of Search ..................................... 219/633, 634, 219/656, 645, 659; 156/274.2, 274.6, 273.7, 272.4, 380.2

[56] References Cited

U.S. PATENT DOCUMENTS

| | | |
|---|---|---|
| 2,241,312 | 5/1941 | Luty . |
| 2,273,423 | 2/1942 | Somes . |
| 2,372,929 | 4/1945 | Blessing . |
| 2,378,801 | 6/1945 | Sidell et al. . |
| 2,423,922 | 7/1947 | Arndt, Jr. . |
| 2,589,777 | 3/1952 | Collins . |
| 2,739,829 | 3/1956 | Pedlow et al. . |
| 2,761,941 | 9/1956 | Ardichvili . |
| 2,898,435 | 8/1959 | Crafts . |
| 3,061,503 | 10/1992 | Gould et al. . |
| 3,101,403 | 8/1963 | Lewis et al. . |
| 3,183,460 | 5/1965 | Bennon . |
| 3,288,979 | 11/1986 | Mills et al. . |
| 3,395,261 | 7/1968 | Leatherman et al. ................... 219/659 |
| 3,427,421 | 2/1969 | Matheson et al. . |
| 3,431,379 | 4/1969 | Yrene . |
| 3,450,856 | 6/1969 | Buck et al. . |
| 3,492,453 | 1/1970 | Hurst . |
| 3,507,735 | 4/1970 | Chisholm . |
| 3,574,031 | 4/1971 | Heller, Jr. et al. . |
| 3,845,268 | 10/1974 | Sindt . |
| 3,864,186 | 2/1975 | Balla . |
| 3,941,643 | 3/1976 | Balla . |
| 3,946,349 | 3/1976 | Haldeman, III . |
| 3,996,402 | 12/1976 | Sindt ..................................... 219/633 |
| 4,005,302 | 1/1977 | Graf et al. . |
| 4,029,837 | 6/1977 | Leatherman ........................ 156/272.4 |
| 4,029,926 | 6/1977 | Austin . |
| 4,091,254 | 5/1978 | Struve . |
| 4,120,712 | 10/1978 | Sindt . |
| 4,180,717 | 12/1979 | Lenk et al. . |
| 4,288,673 | 9/1981 | Ishibashi ................................ 219/656 |
| 4,296,295 | 10/1981 | Kiuchi . |
| 4,304,975 | 12/1981 | Lenk et al. . |
| 4,313,777 | 2/1982 | Buckley et al. ...................... 219/633 |
| 4,343,982 | 8/1982 | Schwartz et al. . |
| 4,355,222 | 10/1982 | Geithman et al. . |
| 4,382,113 | 5/1983 | Schwartz et al. . |
| 4,416,713 | 11/1983 | Brooks . |
| 4,421,588 | 12/1983 | Davies . |

(List continued on next page.)

FOREIGN PATENT DOCUMENTS

| | | |
|---|---|---|
| 0461979B1 | 4/1994 | European Pat. Off. . |
| 54-25542 | 2/1979 | Japan . |

OTHER PUBLICATIONS

J. Giachino, Welding Skills And Practices, Am. Tech. Soc., Chicago, Ill. (1960, 1965, 1967, 1971, 1976) 393–401.

Primary Examiner—Philip H. Leung
Attorney, Agent, or Firm—John C. Hammar

[57] ABSTRACT

An induction coil is passed over an interface between two resinous parts to be welded and an alternating magnetic field generated by the coil induces eddy currents in a foraminous susceptor positioned in the interface between the two parts. Pressure is applied to squeeze the two parts together while the induction heating of the susceptor raises the temperature of the resin in the faying surfaces of the two parts to the softening temperature so that resin flows through the interstices in the susceptor and bonds the two parts together. The induction heating and pressure application passes are repeated four or more times, increasing the power to the induction coil in the later passes to increase the heat input. The strength and continuity of the weld improves with each pass, although the incremental improvement diminishes after about four passes.

20 Claims, 4 Drawing Sheets

U.S. PATENT DOCUMENTS

| | | |
|---|---|---|
| 4,445,951 | 5/1984 | Lind et al. . |
| 4,521,659 | 6/1985 | Buckley et al. .................... 156/272.4 |
| 4,653,396 | 3/1987 | Wennerberg . |
| 4,673,450 | 6/1987 | Burke . |
| 4,768,433 | 9/1988 | Boissevain . |
| 4,791,260 | 12/1988 | Waldman ................................ 219/645 |
| 4,822,972 | 4/1989 | Sugioka et al. . |
| 4,897,518 | 1/1990 | Mucha et al. . |
| 4,904,972 | 2/1990 | Mori et al. . |
| 4,919,759 | 4/1990 | Ilmarinen et al. . |
| 4,947,464 | 8/1990 | Mori et al. . |
| 4,978,825 | 12/1990 | Schmidt et al. ........................ 219/659 |
| 5,001,319 | 3/1991 | Holmstrom ............................. 219/645 |
| 5,074,019 | 12/1991 | Link . |
| 5,079,817 | 1/1992 | Anstotz et al. . |
| 5,101,086 | 3/1992 | Dion et al. . |
| 5,199,791 | 4/1993 | Kasanami et al. . |
| 5,250,776 | 10/1993 | Pfaffmann . |
| 5,283,409 | 2/1994 | Brendel et al. . |
| 5,313,034 | 5/1994 | Grimm et al. .......................... 219/634 |
| 5,313,037 | 5/1994 | Hansen et al. . |

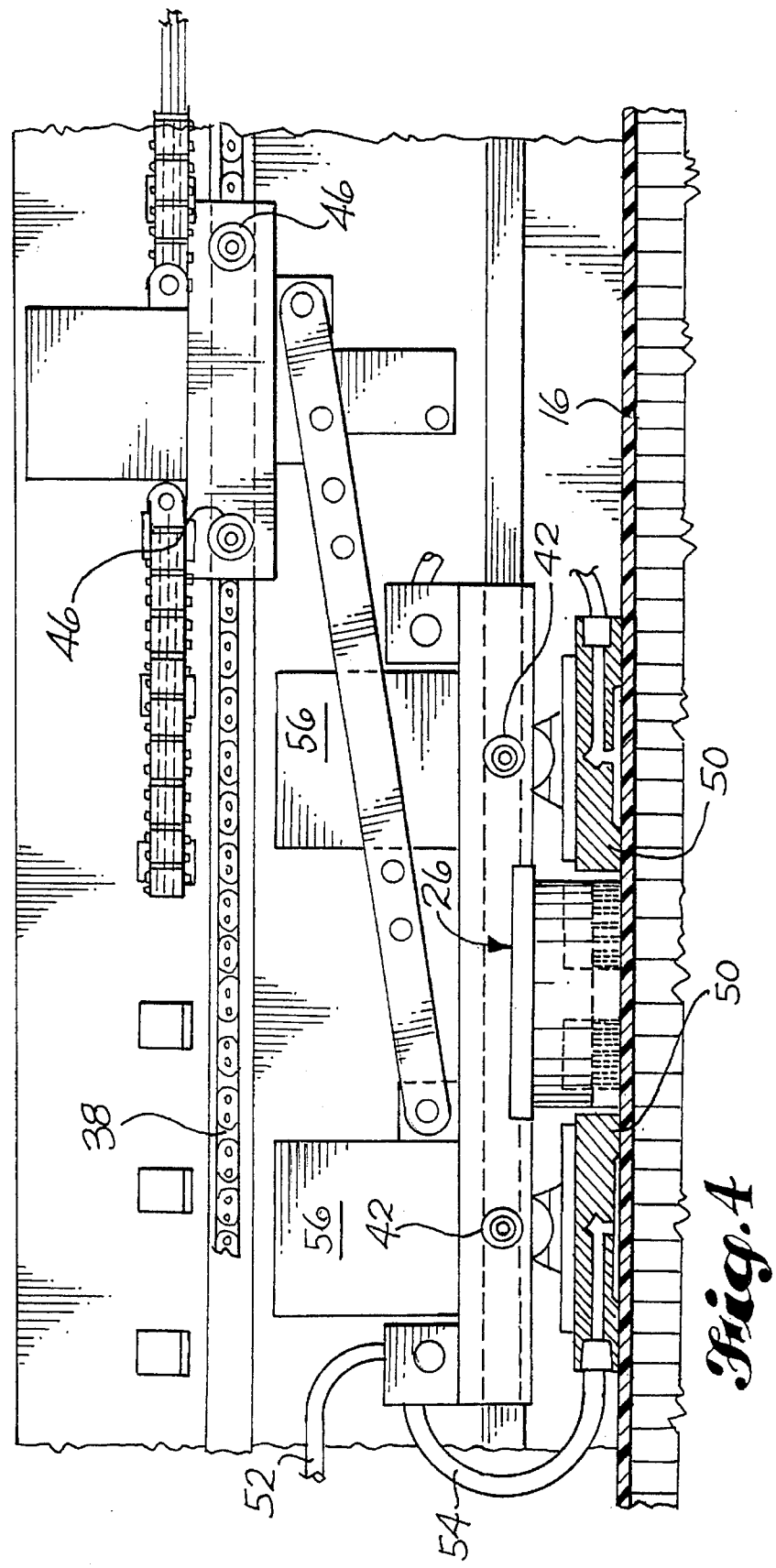

MULTIPASS INDUCTION HEATING FOR THERMOPLASTIC WELDING

This invention relates in general to induction welding of thermoplastic materials to form a thermoplastic fusion bond and, in particular, to welding of thermoplastic and/or thermoset composite assemblies using an induction coil traveling over a susceptor positioned in the bondline to concentrate inductive heating in the bond area.

BACKGROUND OF THE INVENTION

Three major joining technologies exist for aerospace composite structures: mechanical fastening, adhesive bonding, and welding. Both mechanical fastening and adhesive bonding are time consuming, costly assembly steps. Mechanical fastening requires expensive hole locating, drilling, and fastener installation. Adhesive bonding requires complicated surface pretreatments and precise fit-up.

In contrast, composite welding holds promise to be an affordable joining process. It features the ability to form high strength, reliable and repeatable bonds of thermoplastic composite components at high production rates with minimal labor and little surface pretreatment. Development of a successful induction welding process would offer significant advantages over traditional mechanical fastening methods, including reduced parts count, short process cycle time, and greater ease of making rapid field repairs of composites or other structures.

Contrasted with adhesive bonding, thermoplastic welding offers another set of significant advantages, including enhanced joint performance (especially hot/wet and fatigue) and little or no loss of bond strength after prolonged exposure to environmental influences, minimal surface preparation, and indefinite shelf life at room temperature.

Thermoplastic welding is a process for forming a fusion bond between two faying thermoplastic faces of two parts to be welded together. A fusion bond is created when the thermoplastic on the surface of the two parts is heated to the melting or softening point and the two surfaces are brought into contact and held in contact while the material cools below the softening temperature.

Simple as the process sounds, and easy as it is to perform in the laboratory on small pieces, it becomes devilishly difficult to perform reliably and repeatably in a real factory on real full-scale parts to build a large structure such as an airplane wing box. The difficulty is in getting the proper amount of heat to the bondline without over heating the entire structure which could cause it to sag, and also in achieving intimate contact of the faying surfaces of the two parts at the bondline during heating and cooling despite the normal imperfections in the flatness of composite parts, thermal expansion of the thermoplastic during heating to the softening or melting temperature, flow of the thermoplastic out of the bondline under pressure, and then contraction of the thermoplastic in the bondline during cooling.

One technique for getting heat to the bondline in a thermoplastic assembly to be welded together is to include a conductive layer or article, known as a "susceptor", between the two surfaces to be welded, and to heat the susceptor by resistive heating so that the susceptor functions as a bondline heat source to melt or soften the thermoplastic at the bondline for fusion of the faying surfaces of the composite components to be joined. The electric current for heating the susceptor can be in the form of eddy currents generated inductively, as taught for example by U.S. Pat. Nos. 3,395,261 and 4,978,825, or it can be conducted directly to the susceptor through tabs or the like as shown in U.S. Pat. No. 5,313,034. One susceptor that is particularly effective for use in an inductive heating welding process is disclosed in U.S. patent application No. 08/068,520, now abandoned.

Significant effort has been expended in developing inductor and susceptor systems to optimize the heating of the bondline in the thermoplastic assemblies to be welded. Induction coil structures and tailored susceptors have now been developed that provide adequate control and uniformity of heating of the bondline, but a big hurdle remaining to perfecting the process to the point of practical utility for producing large scale aerospace-quality structures in a production environment is the aspect of the process dealing with the control of the surface contact of the faying surfaces of the two parts to be welded together, and the timing, intensity, and schedule of heat application so the material at the faying surfaces is brought to and maintained within the proper temperature range for the requisite amount of time for an adequate bond to form, and is maintained in intimate contact while the melted or softened material hardens in its bonded condition.

Large scale parts such as wing spars and ribs, and the wing skins that are bonded to the spars and ribs, are typically on the order of 20–30 feet long at present, and potentially can be hundreds of feet in length when the process is perfected for full scale commercial production. Parts of this magnitude are very difficult to produce with perfect flatness. Instead, the typical part will have various combinations of surface deviations from perfect flatness, including large scale waviness in the direction of the major length dimension, twist about the longitudinal axis, dishing or sagging of "T" beam flanges, and small scale surface defects such as asperities and depressions. These irregularities interfere with full surface area contact between the faying surfaces of the two parts and actually result in surface contact only at a few "high points" across the intended bondline. Additional surface contact can be achieved by applying pressure to the parts to force the faying surfaces into contact, but full intimate contact is difficult or impossible to achieve in this way. Applying heat to the interface by electrically heating the susceptor in connection with pressure on the parts tends to flatten the irregularities further, but the time needed to achieve full intimate contact with the use of heat and pressure is excessive, can result in deformation of the top part, and tends to raise the overall temperature of the "T" beam flanges to the softening point, so they begin to yield or sag under the application of the pressure needed to achieve a good bond.

SUMMARY OF THE INVENTION

Accordingly, it is an object of this invention to provide an improved thermoplastic welding process that enables a moving coil welding process to produce continuous or nearly continuous fusion bonds over the full area of the bondline to yield very high strength welds reliably, repeatably and with consistent quality. Another object of this invention is to produce improved low cost, high strength composite assemblies of large scale parts, fusion bonded together with consistent quality. Yet another object of this invention is to provide an improved moving coil thermoplastic fusion welding process that uses a schedule of heat application that maintains the overall temperature of the structure within the limit in which it retains its high strength, so it requires no internal tooling to support the structure against sagging which otherwise could occur above the high strength temperature limit. Still another object of this invention is to provide an improved moving coil fusion bonding welding process that produces nearly complete bondline area fusion on standard production composite material parts having the usual surface imperfections and deviations from perfect flatness. Yet another object of this invention is to provide an improved process for producing aircraft structure of consistent high quality and greatly reduced cost by eliminating fasteners and the expense of drilling holes, inspecting the holes and the fasteners, inspecting the fasteners after installation, sealing between the parts and around the fastener and the holes, mismatch of materials, and arcing from the fasteners.

These and other objects of the invention are attained in a welding process for producing welds in thermoplastic composite material with uniform and consistent quality to give confidence that no catastrophic unzipping of a weld line in the structure could occur because of a failure at some weak point in the weld. The present invention focuses upon the fundamental mechanics of fusion bonding: intimate and continuous contact along the bond line and sufficient total time at a temperature high enough at which deep inter diffusion of the molecular polymer chains can occur between faying surfaces in contact to achieve a continuous and uniform quality fusion bond along the entire bond line. In the process, an induction heating workcoil is passed multiple times over a bond line while applying pressure in the region of the coil to the components to be welded, and maintaining the pressure until the resin hardens. The resin at the bond line is heated to the softening or melting temperature with each pass of the induction work coil and pressure is exerted to flow the softened/melted resin in the bond line and reduce the thickness of the bond line while improving the intimacy of the faying surface contact with each pass to militate for complete continuity of bond. The total time at the softened or melted condition of the thermoplastic in the faying surfaces is sufficient to attain deep inter diffusion of the polymer chains in the materials of the two faying surfaces throughout the entire length and area of the bondline, thereby producing a bond line of improved strength and integrity in the completed part, but the total time of the faying surfaces at softened temperature is in separate time segments which allows time for the heat in the interface to dissipate without raising the temperature of the entire structure to the degree at which it loses its strength and begins to sag, so the desired shape and size of the final assembly is maintained.

BRIEF DESCRIPTION OF THE DRAWINGS

The invention and its many objects and advantages will become better understood upon reading the following detailed description of the preferred embodiment in conjunction with the following drawings, wherein:

FIG. 4 is an enlarged cross-sectional elevation of an interface between two composite parts to be welded at four different phases of the process, showing an exaggerated surface profile for purposes of illustration.

DETAILED DESCRIPTION

Figure 1:
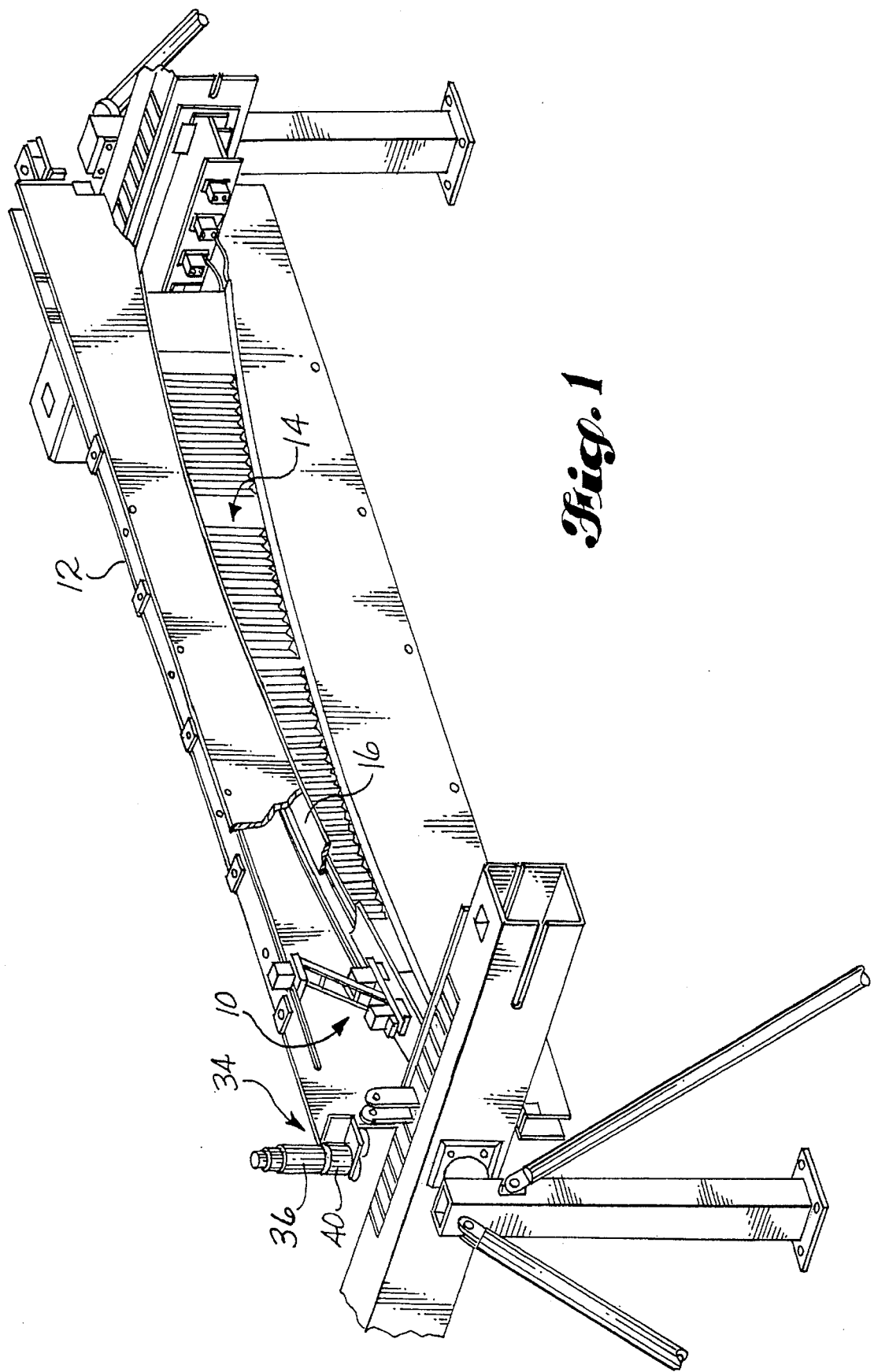
FIG. 1 is a perspective view of a welding apparatus for practicing the process of this invention.

Turning now to the drawings, wherein like reference designate identical or corresponding parts, and more particularly to FIG. 1 thereof, a thermoplastic welding head 10 is shown supported on tooling headers 12 over thermoplastic composite parts to be fusion bonded together. The parts, in this example, include a thermoplastic spar 14 and a thermoplastic wing skin 16, only a small section of which is shown in FIG. 1. The spar 14 is in the form of an "I" beam having a top cap 18, a bottom cap 20, and a web 22 extending between the top and bottom caps 18 and 20. The spar 14 extends lengthwise of the wing of the airplane for which the parts are being assembled, and the wing skin is to be bonded over the full length and surface area of the spar cap 18 with sufficient strength to resist the tensile and peeling forces it will experience in flight. The apparatus shown is more fully described in U.S. patent application No. 08/352,991 filed on Dec. 9, 1994, by John Mittleider and entitled "Thermoplastic Welding", the disclosure of which we incorporate by reference herein.

A conductive foraminous susceptor 24, encapsulated in a thermoplastic ribbon, is inserted between the spar cap 18 and the wing skin 16. Typically the thermoplastic material in which the susceptor is encapsulated will be the same or a slightly lower temperature formulation of the same thermoplastic material that is on the surface of the spar cap 18 and the lower laying surface of the wing skin 16.

The welding head 10 can be any moving coil apparatus that is capable of applying pressure during induction heating of the bondline to promote fusion, and for a period thereafter sufficient for the resin to cool and harden in its bonded condition. One suitable welding head is disclosed in an application by Karl Hansen entitled "Conformal Skate for Induction Welding" filed concurrently herewith. A preferred welding apparatus, shown in FIG. 2, includes an induction coil 26 for inducing eddy currents in the susceptor 24. The eddy currents heat the susceptor by electrical resistance heating and soften or melt the thermoplastic material in the faying surfaces of the parts so it flows through the interstices in the susceptor, inter diffuses, and fuses together. Two suitable induction coils are described in the following documents which are incorporated herein by reference: a patent application by Hansen and Weisberg entitled "Asymmetric Work Coil for Induction Welding", and U.S. Pat. No. 5,313,037. The coil shown in the '037 patent provides zero eddy current at the center with the current density increasing toward the edges. Use of a tailored susceptor is desirable to counterbalance the nonuniform eddy current density that the coil produces from centerline to edge to achieve uniform heating, and such a susceptor is disclosed in U.S. patent application 08/286,360 entitled "Tailored Susceptors for Induction Thermoplastic Welding" filed by Karl A Hansen. and C. David Lunden on Aug. 4, 1994.

Figure 2:
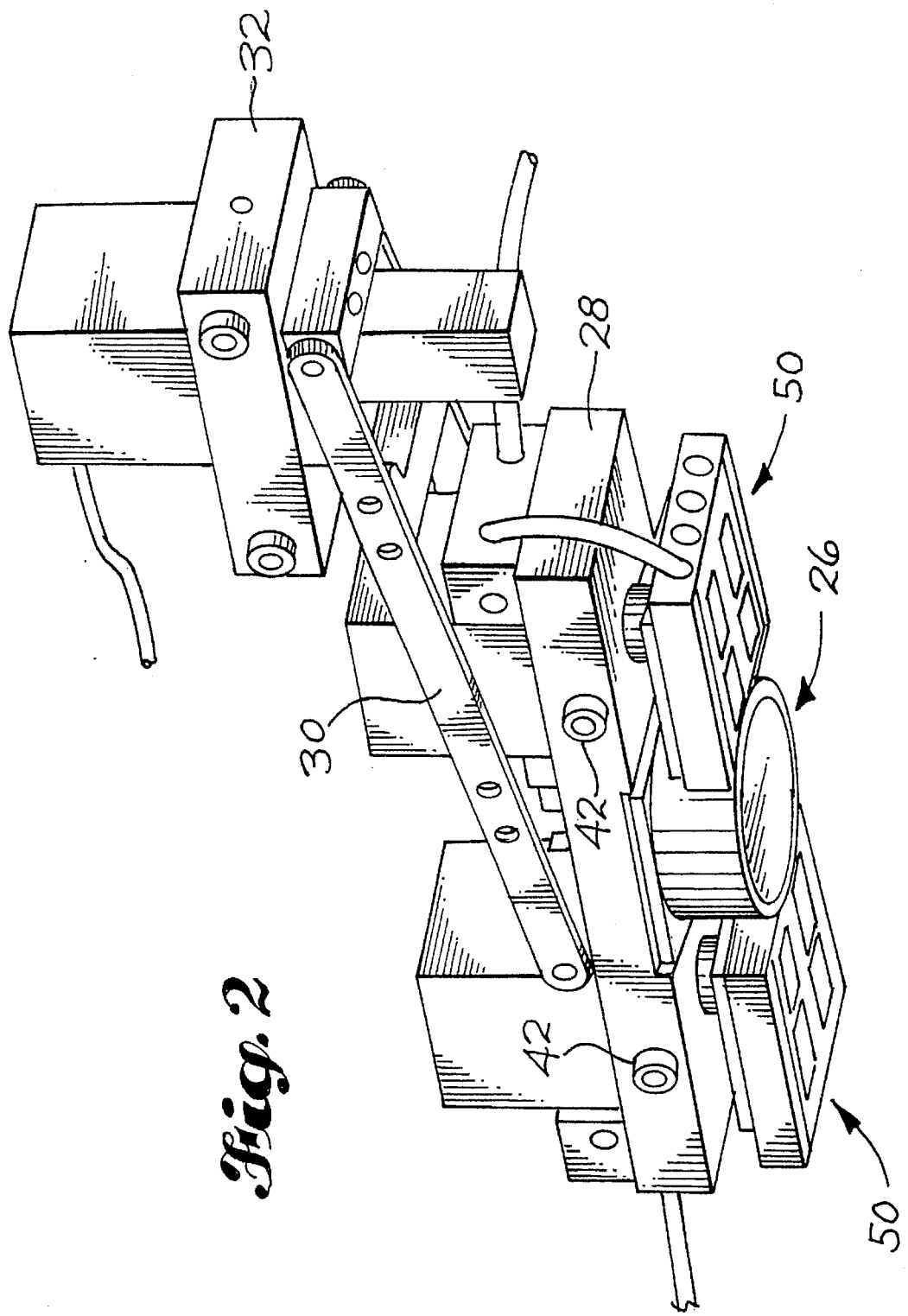
FIG. 2 is a perspective view of the welding head shown in FIG. 1.
Figure 3:
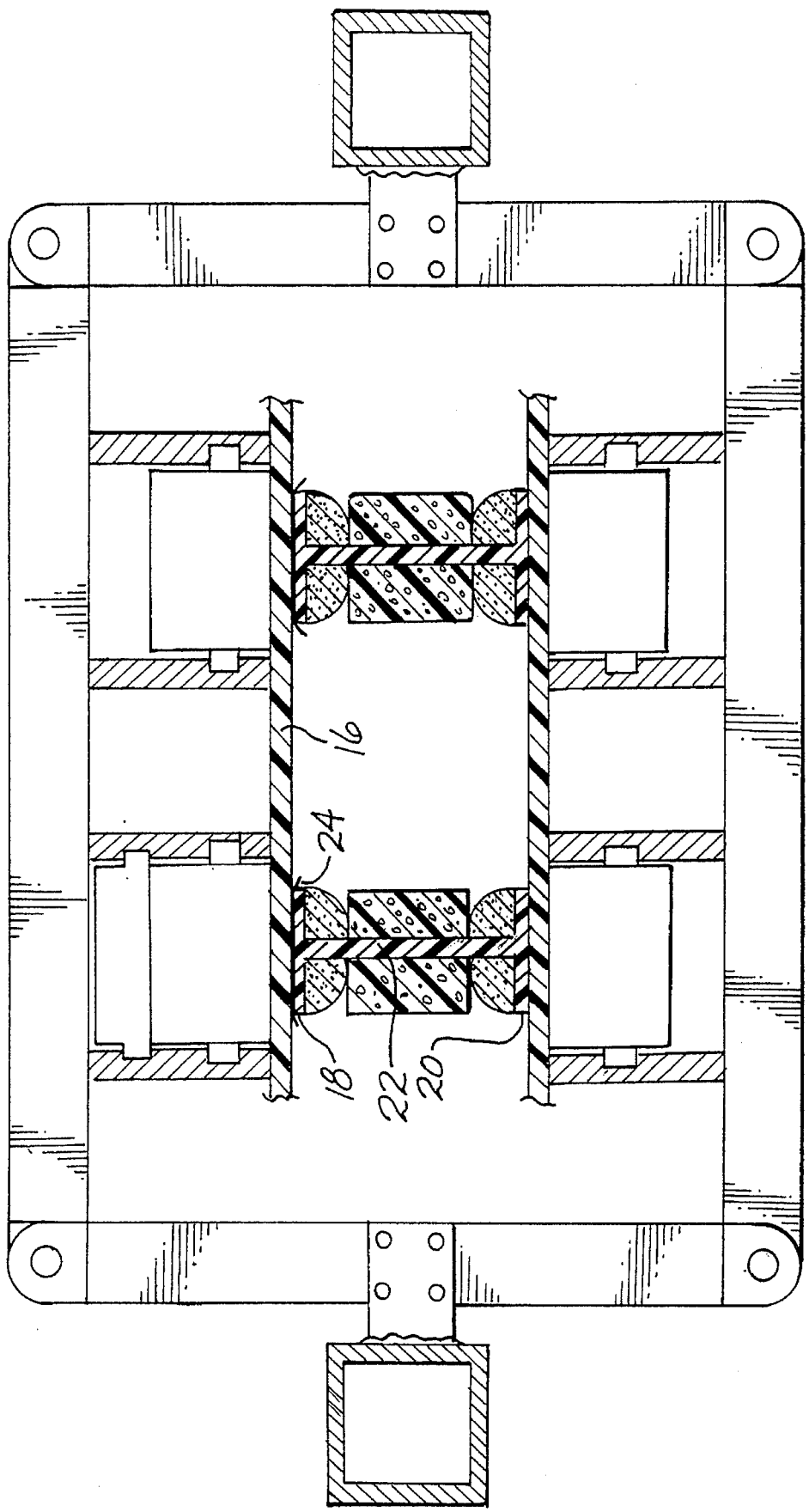
FIG. 3 is a cross sectional end elevation of the apparatus shown in FIG. 1, showing a portion of an assembly being welded by the apparatus.

The induction work coil 26 is mounted in the welding head shown in FIG. 2 in the center of a lower frame 28 which is pinned to a link 30 connecting the lower frame 28 to an upper frame 32. The upper frame 32 is pulled by a motive apparatus 34 including a stepper motor 36 driving a drive sprocket and a chain loop 38 through a reduction gear unit 40. A pair of camroll bearings 42 projects from both sides of the lower frame 28 into cam grooves 44 milled into the inside surfaces of the headers 12 to guide and support the lower frame 28. A similar set of camroll bearings 46 projects outward from the upper frame 32 into a straight cam groove 48 to guide the upper frame as it is pulled by the chain loop 38 from one end of the wing skin 16 to the other.

The process of welding the wing skin 16 to the spar cap 18 begins with assembling the parts together with the resin-encapsulated foraminous conductive susceptor 24 interposed between the faying surfaces of the parts. In the case of a wing box, this involves attaching the susceptor 24 to the outer surfaces of the spar caps 18 and then sandwiching the spars between the upper and lower wing skins. The parts are held in position and squeezed together by a force exerted by a pair of air bearing pads 50 to which air under pressure is delivered by way of air lines 52 and distributed to the air bearing pressure pads 50 by separate air lines 54. The air to the pads 50 reduces the frictional drag on the pressure pads 50 on the top surface of the wing skin 16 and helps to cool the parts after the coil 26 has passed. The induction work coil 26 is pulled along the intended bond line over the outer surface of the two wing skins in alignment with the susceptors 24 while producing an alternating magnetic field which projects through the wing skins and around the susceptor, generating eddy currents in the susceptor. The eddy currents induced by the magnetic field are of sufficient amperage to heat the susceptor by dielectric heating, raising the temperature of the thermoplastic material in the faying surfaces to its softening or melting temperature. The molten or softened thermoplastic material from the faying surfaces of the two facing parts flows in and around the interstices of the foraminous susceptor and fuses together, thereby creating a fusion bond. After the first pass of the welding head, the process is repeated three or more times, increasing the power to the coil after the second pass and, if desired, increasing the pressure exerted by air cylinders 56 on the pressure pads 50. The structure and operation of the apparatus is described in greater detail in the aforesaid Mittleider application, to which reference is invited.

The bond strength improves with repetitions of the welding passes of the welding head over the same bondline. This phenomenon was discovered fortuitously and was investigated in detail after it was identified. We found that the effect of multiple passes of the induction coil serves to create the optimal conditions for achieving a fusion bond with the desired characteristics of continuity over the entire bond line, and substantial molecular inter diffusion of the materials in the faying surfaces to produce a bond line of high pull-off strength with a complete or nearly complete absence of voids.

The mechanisms for achieving a fusion bond include intimate contact and "healing". Intimate contact of the two faying surfaces is a function of force exerted on the parts to squeeze them together, and temperature-dependent viscosity. The force exerted on the parts is distributed over a certain surface area as interfacial pressure tending to bring the faying surfaces together, and the viscosity of the surface material is manifested by the tendency of high spots in the surface to yield of flow so that low spots in the two surfaces can come together. "Healing" is partly a process in which molten or soften materials flow together and blend where they come into contact, and partly a process of molecular penetration of the polymer chains in the material of one surface into the molecular matrix of the material in the other faying surface. The average penetration distance of the polymer chains, without the beneficial mixing effect achieved by flowing the materials in the faying surfaces, increases as a quarter power of time.

Objective and easily made observations of a bond line that are indicative of the quality of the bond are reduction in bondline thickness, improved ratio of bonded vs. unbonded surface area in the bondline (or expressed conversely, a reduction of the amount of unbonded surface area in the bondline), and improved pass-through of bonding resin through the interstices of the susceptor. These factors are easily measured by examining the welded part and then pull testing short sections to destruction, which also provides direct bond strength data.

Irregularities such as hollows, depressions and asperites in the faying surfaces of the parts, and other deviations from perfect flatness can interfere with and prevent continuos intimate contact along the full surfaces of the parts where bonding is intended. These deviations from perfect flatness include small scale surface features such as asperites, depressions or hollows, scratches and bumps, and also large scale features such as waviness in the direction of the major length dimension, twist about the longitudinal axis, dishing or sagging of "I" beam flanges, and warping such as humping or bowing in the longitudinal direction. These irregularities can be minimized by performing a surface profile scan of the faying surfaces and then machining a pad-up area on one of the parts to improve the fit-up of the parts. However, some irregularities at some scale will always exist and this invention minimizes the deleterious effect of these surface irregularities on the bond quality.

When the two parts with these surface irregularities in their faying surfaces, are brought together with a susceptor between them, the first pass of the welding head heats the susceptor to about the melting temperature of the thermoplastic faying surfaces of the parts. All of the resin encapsulating the susceptor melts and all of the resin in contact with the susceptor/resin pack also melts, and the pressure exerted on the wing skin in the vicinity of the work coil presses the faying surfaces closer together and extrudes excess resin from the tops of the projecting surface irregularities. However, surface irregularities upstream and downstream of the zone being heated by the coil remain uneven and continue to interfere with perfect intimate contact by the full surface areas of the faying surface, and the stiffness of the top part limits the vertical excursion that the top part can make into contact with a large scale depression in the underlying part. Some of the projecting surface irregularities in the heated zone is are melted and flattened in this first pass and the parts are now welded together with some percentage of the bond line laying surfaces fusion bonded together. Some small scale irregularities may remain, preventing full intimate contact of the surfaces, and a larger percentage of the large scale irregularities may still remain, also preventing some contact.

During the second pass of the welding head, the resin in contact with the susceptor is again heated to the melting or softening temperature by the heated susceptor, and the pressure exerted by the pressure pads on the welding head presses the faying surfaces into more intimate contact, extruding additional thermoplastic from the bondline. The projections above the plane of perfect flatness on the two parts are reduced further, and the hollows are partially filled in by melted or softened resin melted off the high points of the surface irregularities.

As mentioned earlier, the susceptor is embed in thermoplastic to simplify the welding process. Making a tape of the susceptor encapsulated in a thermoplastic which is the same or compatible with the thermoplastic on the faying surfaces of the two parts to be welded together ruggedizes the otherwise fragile susceptor and ensures an adequate quantity of thermoplastic around the susceptor and essentially uniform adhesive thickness across the welding bond line. It also improves the heat transfer characteristics of the susceptor to the faying surfaces of the two thermoplastic parts. Our typical tape is about 2 inches wide with DuPont's Avimid KIIIA polyimid resin, although we can use PEEK, PEKK, PES, or any other thermoplastic. The susceptor-encapsulating resin and the additional ribbon of resin inserted in the interface must be compatible with the matrix resin in the composite and generally is the same resin or slightly different formulation (with a slightly lower melt temperature) as the matrix resin.

The composites we join with thermoplastic welding are typically the same materials and are prefabricated before the welding. Typically, the composite is a carbon or graphite fiber reinforced polyimide resin, such as Dupont's Avimid KIIIB, that has a melt temperature of about 310° C. (620° F.). It is resin rich in the region of the bond line because we add a ribbon of KIIIA polyimide resin, that has a slightly lower melt temperature, in the areas of the bond line. We complimentary profile the surfaces of the composite parts to improve the fit-up of the two parts and ensure a bond line free of voids. We assemble the composite parts with the resin encapsulated susceptor tape lying along the bond line, and complete the welding by moving the induction coil from one end to the other at about 1–4 inches (2.5–10 cm) per minute.

While we have described the preferred embodiments, those skilled in the is art will readily recognize that numerous alterations, variations, and modifications may be made which attain the same objects of the invention. Therefore, we intend that the claims be interpreted liberally to include the full range of equivalents of these alterations, modifications and variations. The examples are given to illustrate the invention and are not intended to limit the spirit and scope of the invention as defined in the following claims, wherein

We claim:

1. A multipass process for thermoplastic welding of a thermoplastic resin along a bond line to prepare a high strength fusion bond connecting two aerospace composite structural parts, comprising the steps of:

(a) inserting a susceptor between two faying surfaces of at least two thermoplastic composite parts to be welded together; the susceptor being made from a material susceptible to induction, having a substantially uniform pattern of openings extending through the material so that the susceptor heats substantially uniformly when subjected to the oscillating magnetic field produced with a induction coil, the susceptor defining a bond line where a fusion bond will connect the parts;

(b) positioning said induction coil in close proximity to said faying surfaces and applying electrical power to said coil to heat said susceptor sufficiently to soften the thermoplastic in said faying surfaces and to create a substantially uniform temperature in the softened thermoplastic;

(c) moving said coil in a first pass along said faying surfaces and simultaneously applying pressure to said parts to force said faying surfaces together to reduce irregularities that otherwise interfere with full surface area contact between the faying surfaces along the bond line and to produce intimate contact between the faying surfaces;

(d) solidifying the thermoplastic by stopping the induction which heats the susceptor;

(e) after said first pass, moving said coil while applying electrical power in a second pass along said faying surfaces and simultaneously applying pressure to said parts to soften the thermoplastic again and to further force said faying surfaces together to achieve intimate contact while having the thermoplastic heal to create a strong fusion bond by penetration of polymer chains in the thermoplastic of one faying surface into the molecular matrix of the thermoplastic in the other faying surface; and (f) after said second pass, performing additional passes of said coil and simultaneous application of pressure to attain a welded bond line of the desired integrity and completeness.

2. The process defined in claim 1, further comprising: increasing said electrical power to said coil in said additional passes after said second pass.

3. The process defined in claim 1, further comprising: increasing said pressure applied to said parts during said additional passes after said second pass to further force said faying surfaces together into intimate contact.

4. The process defined in claim 1, further comprising: sensing the temperature in said bondline during application of induction heating and pressure and adjusting the duration of said application of induction heating and pressure to ensure that the temperature reaches a desired temperature range and remains there within a desired time period range.

5. The process defined in claim 1, further comprising: adjusting said electrical power to said induction coil as said induction coil travels along said bondline over a part having a tapered thickness to maintain the field strength at said susceptor about equal as said part thickness changes.

6. The process defined in claim 1, further comprising: waiting for a time between said passes of said coil until said bond line temperature decreases to less than one half of said softening temperature.

7. The process of claim 1 further comprising the step of: monitoring the bond line thickness, the ratio of bonded versus unbonded surface area in the bond line, and the pass-through of bonding resin through the interstices of the susceptor to attain a quality bond.

8. The process of claim 7 wherein the bond line has nearly a complete absence of void to provide high pull-off strength for the weld.

9. The process of claim 8 wherein the weld has continuity over the entire bond line achieved with substantial molecular interdiffusion of the thermoplastic in the faying surfaces.

10. The product of the process of claim 9.

11. The process of claim 1 wherein the parts include a wing skin and a spar cap.

12. The product of the process of claim 11.

13. The process of claim 11 wherein the thermoplastic is selected from the group consisting of polyimide, PEKK, PEEK, or PES.

14. The process of claim 1 wherein the susceptor is encapsulated in thermoplastic resin of the same or slightly different formulation as the thermoplastic of the parts.

15. The process of claim 14 wherein the thermoplastic is selected from the group consisting of polyimide, PEKK, PEEK, or PES.

16. The product of the process of claim 15.

17. The process of claim 1 wherein the temperature in the softened thermoplastic is about 310° C. (620° F.).

18. The process of claim 1 further comprising the step of: complimentary profiling the faying surfaces to improve the fit-up and to ensure a bond line free of voids.

19. A method of producing a fusion bond at an interface between two overlapping thermoplastic resin faying surfaces of two composite parts to produce a thermoplastic weld on a bondline in the overlapping region of the two parts, comprising the steps of:

passing an induction coil over said bondline in said overlapping region while energizing said induction coil with an alternating current to generate a magnetic field that penetrates into said interface;

positioning an electrically conductive foraminous susceptor in said interface;

inductively generating eddy currents in said susceptor and resistively heating said susceptor with said eddy currents;

softening said thermoplastic resin in said faying surfaces of said two parts with heat from said susceptor to achieve a substantially uniform temperature in the resin in the interface sufficient to permit intimate contact and healing in forming the fusion bond;

applying pressure to said parts while maintaining the softening temperature so that said resin flows through the foramens in said susceptor and bonds the two parts together by molecular interduffusion; and repeating said passing, generating, softening and pressing steps a multiplicity of times, while raising the energizing power to said coil in the latter passes to increase the heat input to said interface and to improve the strength and continuity of said weld with each pass, wherein the fusion bond attained is substantially void-free, having continuity over the entire bondline characterized by substantial molecular interdiffusion of the resin in the faying surfaces to produce a fusion bond of high pull-off strength.

20. A welded composite assembly comprising:

(a) first and second thermoplastic composite members arranged to define a bond line;

(b) a fusion bond of the thermoplastic along said bond line to form a integral region connecting the composite members together; and (c) a foraminous conductive susceptor embedded within said integral region;

wherein said integral region was formed by:

(i) inserting said susceptor between two faying surfaces of said first and second parts, said susceptor having a substantially uniform pattern of openings extending through the material so that the susceptor heats substantially uniformly when subjected to eddy currents induced by an alternating magnetic field produced with a induction coil and produces a substantially uniform temperature in softened thermoplastic from said faying surfaces along said bond line;

(ii) positioning said induction coil in close proximity to said faying surfaces and applying alternating electrical power to said coil;

(iii) moving said coil in a first pass along said faying surfaces and simultaneously applying pressure to said parts to force said faying surfaces together;

(iv) after said first pass, moving said coil while applying electrical power in a second pass along said faying surfaces and simultaneously applying pressure to said parts to soften the thermoplastic again and to force said faying surfaces together while the thermoplastic is softened;

(v) after said second pass, performing additional passes of said coil and simultaneous application of pressure to attain a welded bond line of the desired integrity and completeness, wherein the fusion bond is substantially void-free, having continuity over the entire bond line through intimate contact and healing characterized by substantial molecular interdiffusion of the resin in the faying surfaces to produce a fusion bond of high pull-off strength.

* * * * *